(12) United States Patent
Taguchi et al.

(10) Patent No.: US 8,349,190 B2
(45) Date of Patent: Jan. 8, 2013

(54) METHOD AND DEVICE FOR CLEANING CIRCULATION WATER

(75) Inventors: Yoshiyuki Taguchi, Chiyoda-ku (JP); Takayuki Nakano, Chiyoda-ku (JP); Masahito Kato, Chiyoda-ku (JP)

(73) Assignee: Koganei Corporation, Chiyoda-ku (JP)

( * ) Notice: Subject to any disclaimer, the term of this patent is extended or adjusted under 35 U.S.C. 154(b) by 146 days.

(21) Appl. No.: 12/985,954

(22) Filed: Jan. 6, 2011

(65) Prior Publication Data

US 2011/0120887 A1 May 26, 2011

Related U.S. Application Data

(62) Division of application No. 11/886,412, filed on Sep. 12, 2007, now Pat. No. 7,901,620.

(30) Foreign Application Priority Data

Mar. 16, 2005 (JP) .................................. 2005-74243

(51) Int. Cl.
*C02F 1/461* (2006.01)
(52) U.S. Cl. ................ 210/748.01; 210/758; 210/743; 210/243; 210/759; 205/775; 205/324; 205/83; 423/23; 204/155; 204/156; 204/554; 204/196.17; 204/571
(58) Field of Classification Search .................. 204/155, 204/156, 554, 571, 193, 194, 242, 672, 228.1, 204/196.17, 298.03; 205/775, 324, 83; 210/748.01, 210/758, 743, 243, 759; 423/23
See application file for complete search history.

(56) References Cited

U.S. PATENT DOCUMENTS 5,549,800 A 8/1996 Iwata

FOREIGN PATENT DOCUMENTS

CN 1465532 A 1/2004
(Continued)

OTHER PUBLICATIONS

Supplemental European Search Report for corresponding European Application No. 05734548.0, dated Sep. 6, 2010, 2pp.

(Continued)

*Primary Examiner* — Joseph Drodge
*Assistant Examiner* — Cameron J Allen
(74) *Attorney, Agent, or Firm* — Christie, Parker & Hale, LLP.

(57) ABSTRACT

The object of the invention is to provide a method for cleaning circulation water, which reduces the cost of operation and maintenance as much as possible, without a cumbersome cleaning operation such as by detaching electrode plates from an electrolysis cleaning tank and removing scale from inside the tank, and to provide a device used in this method. Accordingly, the present invention provides a method for cleaning circulation water, comprising the steps of flowing circulation water to be cleaned between electrode plates placed in a face-to-face manner between one another; and applying DC voltage between the electrode plates, allowing one or more metal ions contained in the circulation water to be precipitated onto the negative electrode plates by electrolysis, to clean the circulation water, wherein the electrode plates used are made of titanium plates, and wherein a desired amount of current flows, while an anodized oxide coating formed on the surface of the positive electrode plates is compulsively subject to dielectric breakdown by increasing the voltage applied to the anodized oxide coating. FIG. 1 is a representative drawing.

9 Claims, 9 Drawing Sheets

FOREIGN PATENT DOCUMENTS

| | | | |
|---|---|---|---|
| JP | 58-35400 | | 3/1983 |
| JP | 61-181591 | | 8/1986 |
| JP | 61-181591 A | * | 8/1986 |
| JP | 4-18982 | | 1/1992 |
| JP | 9-38668 | | 2/1997 |
| JP | 9-103797 | | 4/1997 |
| JP | 11-114335 | | 4/1999 |
| JP | 2001-137858 | | 5/2001 |
| JP | 2001-137891 | | 5/2001 |
| JP | 2001-259690 | | 9/2001 |
| JP | 2003-200170 | | 7/2003 |
| JP | 2003200170 A | * | 7/2003 |
| JP | 3096941 | | 1/2004 |
| JP | 3096941 U | | 1/2004 |
| JP | 2004-116136 | | 4/2004 |
| JP | 2005-13966 | | 1/2005 |
| KR | 20-0372276 | | 1/2005 |
| WO | WO 2004/096717 | | 11/2004 |

OTHER PUBLICATIONS

Bannoud, Abdulhakim, "The electrochemical way of removing the hardness of water", Desalination, 93 (1993) pp. 545-555.
Office action, with English translation, dated Feb. 6, 2009, for corresponding Korean Patent Application No. 10-2007-7021056.
Japan Office action dated Jan. 22, 2008, for priority Japanese application 2005-074243, with English translation indicating relevance.
English translation of JP 2003-200170 listed above, Sep. 12, 2007.
English translation of JP 3096941U listed above, dated Sep. 12, 2007.
English translation of JP 2004-116136 listed above, dated Sep. 12, 2007.
English translation of CN 1465532 listed above.
Weimin, W., et al. *Application and Development of High Power Pulse Dischare Under Water*, Electronics & Electricity Engineering Department, Dalian University of Technology, vol. 5, No. 148, Dec. 5, 2002, pp. 85-89.
English translation of Section 3.4 of Weimin article listed above.
Chinese Office action dated Jun. 19, 2009, for corresponding Chinese application 200580048326.0, with English translation.
International Search Report, dated Aug. 30, 2005, corresponding to PCT/JP2005/007781.
Patent Abstracts of Japan, Publication No. 2003-200170, Published on Jul. 15, 2003, in the name of Karasawa.
Patent Abstracts of Japan, Publication No. 2004-116136, Published on Apr. 15, 2004, in the name of Takimoto, et al.
Patent Abstracts of Japan, Publication No. 2005-013966, Published on Jan. 20, 2005, in the name of Taguchi, et al.
Patent Abstracts of Japan; Publication No. 58-035400; Date of Publication: Mar. 2, 1983; in the name of Masamichi Kuramoto et al.
Patent Abstracts of Japan, Publication No. 61-181591; Date of Publication: Aug. 14, 1986; in the name of Toshiaki Takano et al.
Patent Abstracts of Japan, Publication No. 04-018982; Date of Publication: Jan. 23, 1992; in the name of Nobutaka Goshima et al.
Patent Abstracts of Japan, Publication No. 09-038668; Date of Publication: Feb. 10, 1997; in the name of Kiyomi Okada.
Patent Abstracts of Japan, Publication No. 09-103797; Date of Publication: Apr. 22, 1997; in the name of Tomohisa Oguchi et al.
Patent Abstracts of Japan, Publication No. 11-114335; Date of Publication: Apr. 27, 1999; in the name of Tsuneo Sugito.
Patent Abstracts of Japan, Publication No. 2001-137858; Date of Publication: May 22, 2001; in the name of Takao Miyanoo.
Patent Abstracts of Japan, Publication No. 2001-137891; Date of Publication: May 22, 2001; in the name of Akira Iimura et al.
Patent Abstracts of Japan, Publication No. 2001-259690; Date of Publication: Sep. 25, 2001; in the name of Kenji Kobata et al.

* cited by examiner

METHOD AND DEVICE FOR CLEANING CIRCULATION WATER

CROSS-REFERENCE TO RELATED APPLICATIONS

This application is a divisional of U.S. patent application Ser. No. 11/886,412, filed on Sep. 12, 2007, which is a National Phase patent application of International Application No. PCT/JP2005/007781, filed on Apr. 25, 2005, which claims priority of Japanese Patent Application No. 2005-074243, filed on Mar. 16, 2005.

TECHNICAL FIELD

The present invention relates to a device for cleaning circulation water, in order to electrically-remove scale contained in cooling water that is used in office facilities, manufacturing plants and the like, or used as circulation water between a condenser and a cooling tower in an air-conditioner.

BACKGROUND ART

Figure 9:
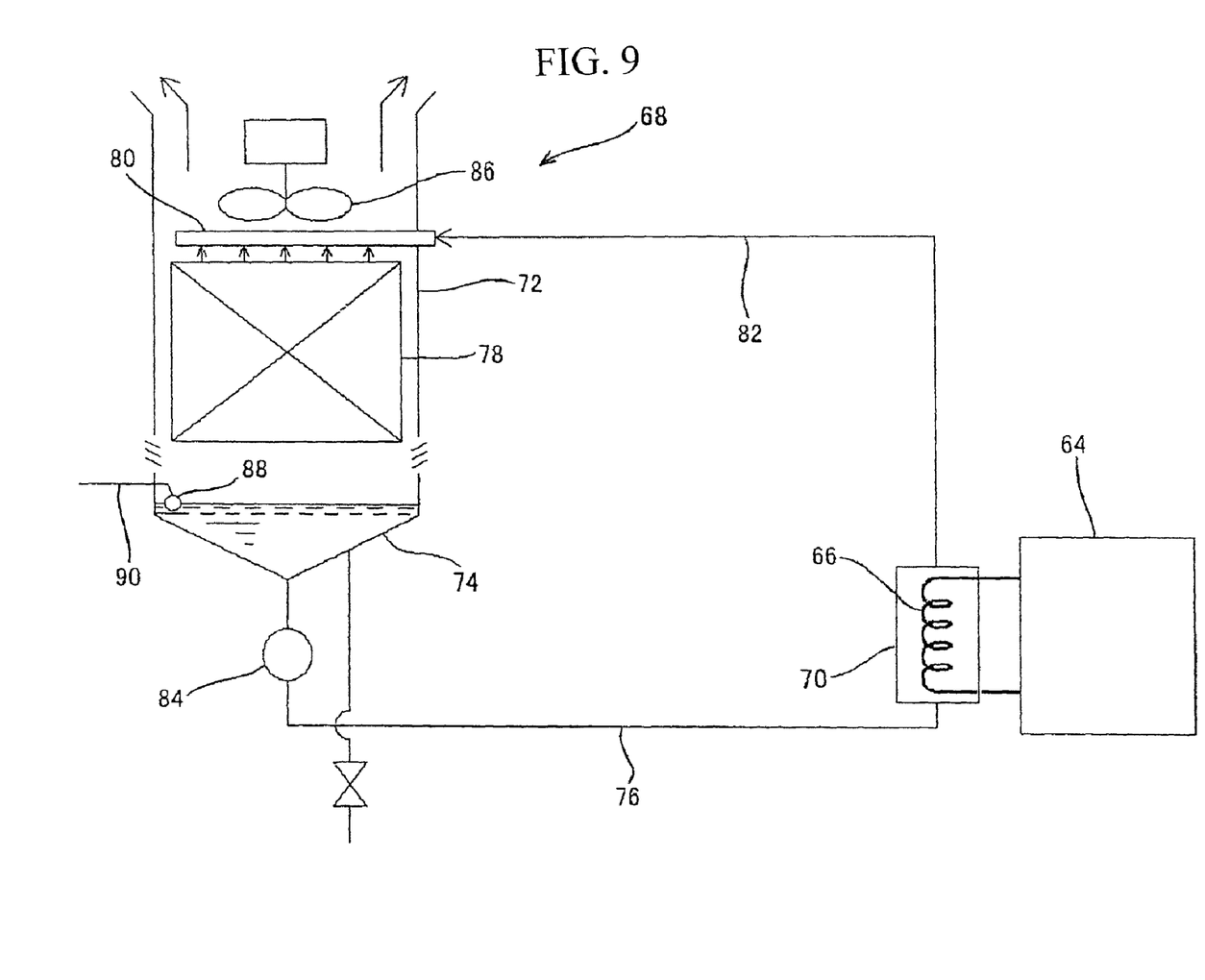
FIG. 9 illustrates an air-conditioning system.

FIG. 9 illustrates an air-conditioning system. As shown in this figure, an air-conditioner 64 comprises a compressor for compressing a gaseous refrigerant (not shown); a condenser 66 for cooling the compressed gaseous refrigerant by cooling water to convert into a liquid refrigerant; and an evaporator into which the liquid refrigerant flows after the pressure of the liquid refrigerant is reduced through an expansion valve (not shown).

The condenser 66 is provided in a cooling tank 70, in order to cool refrigerant flowing inside the condenser 66. A cooling tower 68, which supplies cooling water to the cooling tank 70 through circulation of the cooling water, comprises a cylindrical tower body 72 and a water receiving bath 74 provided below the tower body. The water receiving bath 74 and the cooling tank 70 are connected together via a supply line 76, so that circulation water in the water receiving bath 74 can be transferred to the cooling tank 70.

A filler unit 78 having a plurality of passages, through which circulation water and cooling air flows, is incorporated in the tower body 72. In order to spray the circulation water onto the filler unit 78, a spray nozzle 80 is attached to the tower body 72. The spray nozzle 80 is connected to the cooling tank 70 via a return line 82, whereby the circulation water in the cooling tank 70 can be supplied to the spray nozzle 80 by a circulation pump 84 provided in the supply line 76.

The circulation water sprayed from the spray nozzle 80 onto the filler unit 78 passes through a plurality of passages formed within the filler unit 78, and then falls into the water receiving bath 74. As described above, a circulation water channel for circulating water therethrough is formed from the cooling tower 68, cooling tank 70, supply line 76 and return line 82, wherein the tower and the bath are connected by supply and return lines, and water can flow through the circulation water channel by operating the circulation pump 84.

A blower 86 provided in the tower body 72 creates air flow in the tower body 72, such that the air flow enters at the bottom of the tower body 72 and then flows through the passages within the filler unit 78 in the direction opposite to the flow of the circulation water. This allows the circulation water to be cooled, by heat-exchanging through contact with the circulation water directly with air, as well as by utilizing the evaporative latent heat of the circulation water. In order to refill the reduced circulation water due to evaporation of the circulation water, cooling water is added to the tower body 72 via a refilling line 90, which may be opened or closed by a float 88.

However, circulation water constantly evaporates away from the cooling tower 68, since the cooling tower 68 utilizes the evaporative latent heat of water in order to cool the circulation water for cooling as described above. Tap water and groundwater used as circulation water in the cooling tower 68 often contains metal ions such as calcium, magnesium, and dissolved silica. As described above, the tap water and groundwater is continuously added to the reduced circulation water due to evaporation thereof.

Accordingly, the concentration of metal ions contained in the circulation water will gradually increase. Specifically, tap water having an electrical conductivity of 100 to 200 micro Siemens per centimeter ($\mu$S/cm) at the beginning of use, will have an increased conductivity of 1000 $\mu$S/cm or more within a few days to a week of operation. The metal ions will then coagulate to form scale, causing a reduction of heat-transferring efficiency by adhering to the heat-exchanging surface of the condenser 66, and an increase of the flow resistance of the cooling water by adhering on the internal surface of piping, through which the circulation water flows.

Further, a large amount of contaminating organisms, such as algae, Legionella bacteria and the like, may grow in the circulation water, and be scattered along with the circulation water in the form of a mist from the cooling tower, causing health problems for people operating around the cooling tower or residing in the vicinity thereof.

To address the problems described above, one measure has been taken in which tap water or groundwater is added to the circulation water to reduce the concentration of metal ions, in order to prevent scale from forming. However, this would disadvantageously increase the cost for circulation water in areas where tap water or groundwater is expensive, and in turn would increase the cost of operating and maintaining of the air-conditioner.

Accordingly, as with the case of business establishments not accessible to low-cost tap water or groundwater, another measure has been taken in which the electric conductivity of the circulation water has been controlled by adding chemicals, so that the adhesion of scale to the heat-exchanging surface of the condenser and the internal surface of piping can be prevented. However, such chemicals have to be added to the circulation water periodically, and result in a higher cost even in this case.

Furthermore, the adhesion of scale to the heat-exchanging surface of the condenser and the internal surface of the piping cannot be completely prevented by adding chemicals to the circulation water. Therefore, the removal of adhered scale, and relating cost and labor are still required, even though the interval removing operation can be extended.

Along with the propagation of algae and bacteria, another measure has been taken in which a biocide is added to the circulation water. However, this cannot suppress the propagation of algae and bacteria in the long term, and the propagated algae and bacteria may be spread into the air from the cooling tower, along with the biocide and the like, causing air pollution.

In order to solve the above described problems, a wide variety of cleaning devices capable of electrically removing metal ions from circulation water by electrolysis have been proposed, as described in Japanese unexamined patent publication Nos. 2001-259690, 4-18982, 61-181591, 58-35400, 2001-137891, 9-103797, 2001-137858, 9-38668, 11-114335, etc.

One example of such a cleaning device, a cleaning device comprising an electrode plate unit having electrode plates placed in a face-to-face manner between one another; and an electrolysis cleaning tank having the electrode plate unit therein, wherein circulation water is introduced to the electrolysis cleaning tank, and positive and negative voltage is applied to the electrode plates, thereby allowing metal ions contained in the circulation water to be precipitated on the surface of the negative electrode plates in the form of scale, and thus removing metal ions from the circulation water, has been proposed.

Reference 1: Japanese unexamined patent publication No. 2001-259690

Reference 2: Japanese unexamined patent publication No. 4-18982

Reference 3: Japanese unexamined patent publication No. 61-181591

Reference 4: Japanese unexamined patent publication No. 58-35400

Reference 5: Japanese unexamined patent publication No. 2001-137891

Reference 6: Japanese unexamined patent publication No. 9-103797

Reference 7: Japanese unexamined patent publication No. 2001-137858

Reference 8: Japanese unexamined patent publication No. 9-38668

Reference 9: Japanese unexamined patent publication No. 11-114335

DISCLOSURE OF INVENTION

However, during long-term operation of these types of cleaning devices, the amount of scale precipitated on the surface of the negative electrode plates is likely to grow over time, and as a result, electric current may be blocked and thus the cleaning performance of the circulation water will be impaired. Therefore, when scale is deposited and reaches or exceeds a certain level, service personnel have to detach the negative electrode plates from the cleaning device and physically remove the scale from the electrode plates. This poses a problem of cumbersome operation and maintenance of the cleaning device, along with increased cost.

To address these problems, one proposed cleaning device allows the polarities of negative and positive electrode plates to be automatically reversed at regular intervals, thereby peeling off scale adhered to the surface of negative electrode plates. However, this cleaning device still requires that service personnel remove scale that has adhered to the surface of negative electrode plates by scraping it away, because scale that has firmly adhered to the surface of electrode plates cannot be completely peeled off and partly remains, the remaining scale would grow and then block the electric current, and as a consequence, circulation water cannot be cleaned. Accordingly, this cleaning device also requires cumbersome operation and maintenance of the device, along with cost.

In addition, this type of cleaning device often uses electrode plates composed of materials, which comprise expensive rare metals including Pt, or are likely to be consumed rapidly such as Al, SUS and Fe. Therefore, significant increased cost for constructing and maintaining the device remains.

The present invention is directed to provide a method for cleaning circulation water, which reduces cost relating to the operation and maintenance without using a cleaning operation, such as by detaching electrode plates from an electrolysis cleaning tank and then cleaning and removing scale inside the electrolysis cleaning tank. The present invention is also directed to provide a device for this method.

The present invention relates to a method for cleaning circulation water, comprising the steps of flowing circulation water to be cleaned between electrode plates placed in a face-to-face manner between one another, applying voltage between the electrode plates, and allowing one or more metal ions contained in the circulation water to be precipitated onto the negative electrode plates by electrolysis in order to clean the circulation water.

The electrode plates used herein are titanium plates. In addition, a desired amount of current flows, while an anodized oxide coating formed on the surface of the positive electrode plates is compulsively subject to dielectric breakdown by increasing the voltage applied to the anodized oxide coating.

Furthermore, voltage applied between the electrode plates may be polarity switched at regular intervals. The applied voltage may also be increased by providing a constant current sufficiently to prevent the anodized oxide coating from forming. In this case, it is preferable that the current flowing between the electrode plates ranges from 0.1 to 20 ampere (A) per an unit area (i.e. 1 $m^2$) of the positive electrode plates, since less than 0.1 $A/m^2$ of the current will not clean the circulation water sufficiently, and more than 20 $A/m^2$ will cause a rapid erosion of the electrode plates and make the electrode plates unusable.

In addition, current flowing between the electrode plates may be increased when the electric conductivity of the circulation water is higher than a predetermined value, while current flowing between the electrode plates may be decreased when the electric conductivity of the circulation water is lower than a predetermined value. It is preferable that the predetermined values for the electric conductivity of the circulation water range from 500 to 1000 μS/cm.

Alternatively, current flowing between the electrode plates may be increased when the redox potential of the circulation water is higher than a predetermined value, while current flowing between the electrode plates may be decreased when the redox potential of the circulation water is lower than a predetermined value. It is preferable that the predetermined values for the redox potential of the circulation water range from plus one hundred (+100) to minus one hundred (−100) mV.

The present invention also relates to a cleaning device for circulation water, comprising a cleaning tank for receiving circulation water to be cleaned and discharging the circulation water; one or more of first electrode plates placed in the cleaning tank; one or more second electrode plates placed in the cleaning tank with a predetermined space from the first electrode plates; and a DC source for applying DC voltage between the first electrode plates and the second electrode plates.

The first and second electrode plates according to the present invention are titanium plates. The DC source outputs DC voltage such that an anodized oxide coating, formed on the surface of the first electrode plates or the second electrode plates, is peeled off and removed by dielectric breakdown.

In addition, the cleaning device for the circulation water may further comprise a polarity switching device capable of switching polarity of voltage applied by the DC source between the first electrode plates and the second electrode plates at regular intervals.

Alternatively, a constant current source may be used as the DC source in the cleaning device for the circulation water. The constant current source is preferably capable of providing constant current between the first electrode plates and the second electrode plates, ranging from 0.1 to 20 amperes per unit area (1 m$^2$) of one of the electrode plates functioning as the positive electrode.

Further, the cleaning device for the circulation water may also comprise a conductivity meter for measuring the electric conductivity of the circulation water; and a current control device, which increases the current flowing between the electrode plates by increasing the output voltage of the DC source, when the electric conductivity of the circulation water obtained by the conductivity meter is higher than a predetermined value, and decreases the current flowing between the electrode plates by decreasing the output voltage of the DC source, when the electric conductivity of the circulation water obtained by the conductivity meter is lower than a predetermined value.

Preferably, the predetermined values for the electric conductivity of the circulation water are in the range of 500 to 1000 µS/cm.

Alternatively, the cleaning device for the circulation water may also comprise an oxidation-reduction potential meter (ORP meter) for measuring the redox potential of the circulation water; and a current control device which increases current flowing between the electrode plates by increasing the output voltage of the DC source, when the redox potential of the circulation water obtained by the ORP meter is higher than a predetermined value, and decreases the current flowing between the electrode plates by decreasing the output voltage of the DC source, when the redox potential of the circulation water obtained by the ORP meter is lower than a predetermined value.

Preferably, the predetermined values for the redox potential of the circulation water are in the range of plus one hundred (+100) to minus one hundred (−100) mV, and more preferably, in the range of minus 50 (−50) to zero (0) mV.

According to the present invention, an anodized oxide coating formed on the surface of the positive electrode plates is compulsively subject to dielectric breakdown, and thus electric current flowing through the circulation water in an amount sufficient to remove scale, while preventing the anodized oxide coating from forming. As a result, the scale contained in the circulation water can be efficiently removed, and the electric conductivity of the circulation water can be maintained within the desired range.

In addition, according to the present invention, cost reduction in operation and maintenance can be effectively achieved, since the scale formed and adhered to the surface of the electrode plates is removed maintenance-free, without cleaning by service personnel, when the cleaning device comprises a polarity switching device capable of switching the polarity of voltage applied between the electrode plates at regular intervals.

Further, according to the present invention, expensive titanium plates can be used efficiently, since two electrode plates placed in a face-to-face manner with each other are consumed almost equally for both, without consuming one of the electrode plates excessively, when voltage applied between the electrode plates is switched in its polarity at regular intervals.

According to the present invention, scale contained in the circulation water can be removed efficiently, by increasing the current flowing between the electrode plates when the electric conductivity of the circulation water is higher than the predetermined value, causing compulsive dielectric breakdown of an anodized oxide coating formed on the surface of the positive electrode plates, and thus allowing the current to flow through the circulation water in an amount sufficient to remove scale, while preventing the anodized oxide coating from forming. On the other hand, consumption of the electrode plates can be effectively suppressed by reducing the amount of current flowing between the electrode plates when the electric conductivity of the circulation water is lower than the predetermined value.

According to the present invention, scale contained in the circulation water can be removed efficiently, by increasing the amount of current flowing between the electrode plates when the redox potential of the circulation water is higher than the predetermined value, causing compulsive dielectric breakdown of an anodized oxide coating formed on the surface of the positive electrode plates, and thus allowing the current to flow through the circulation water in an amount sufficient to remove scale, while preventing the anodized oxide coating from forming. On the other hand, consumption of the electrode plates can be effectively suppressed by reducing the amount of current flowing between the electrode plates when the redox potential of the circulation water is lower than the predetermined value.

BEST MODE FOR CARRYING OUT THE INVENTION

Figure 1:
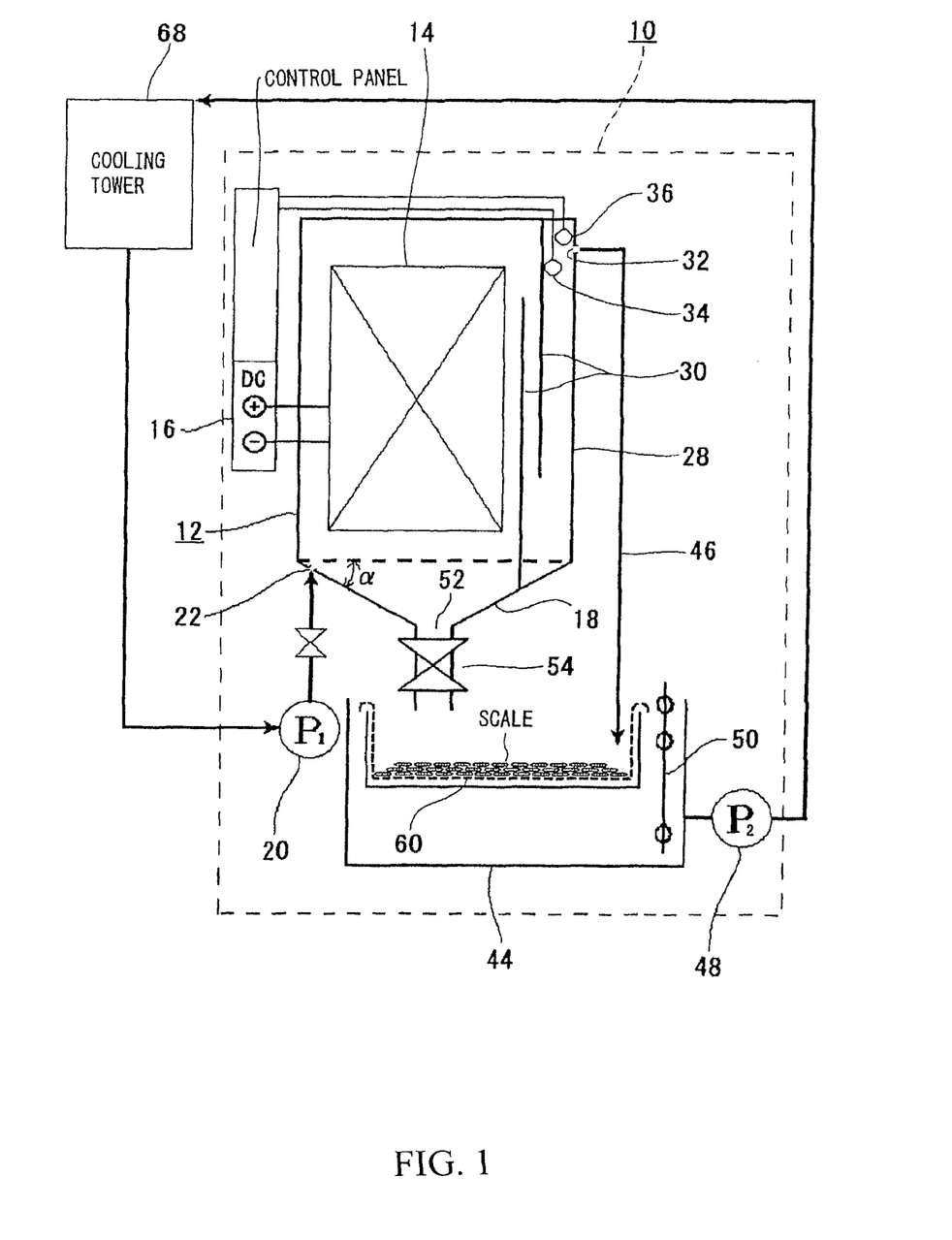
FIG. 1 illustrates a device for cleaning circulation water in a cooling tower, according to one embodiment of the present invention.
Figure 2:
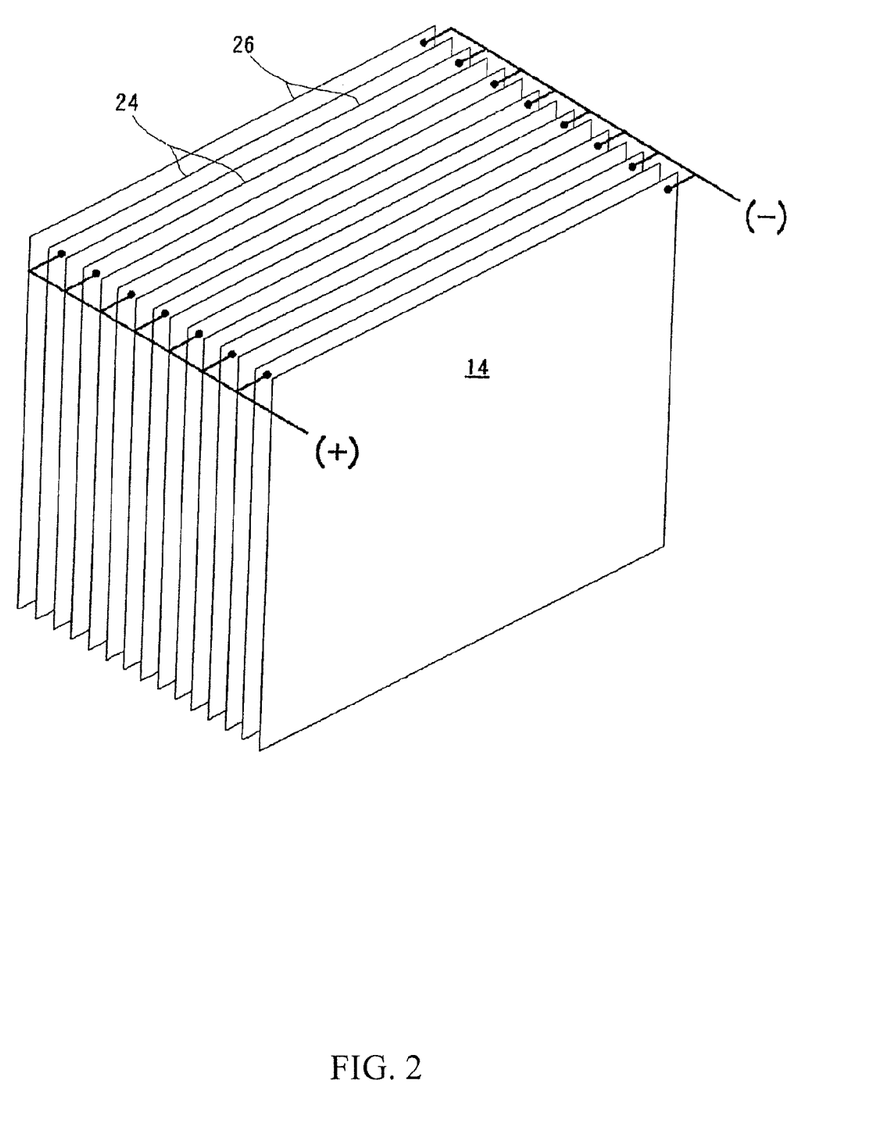
FIG. 2 illustrates an electrode plate unit used in the cleaning device of FIG. 1.

FIG. 1 illustrates a cleaning device for circulation water in a cooling tower, according to one embodiment of the present invention. FIG. 2 illustrates an electrode plate unit used in the cleaning device depicted in FIG. 1.

In these figures, the numeral 10 corresponds to the cleaning device, and this cleaning device 10 comprises an electrolysis cleaning tank 12; an electrode plate unit 14 included in the electrolysis cleaning tank 12; and a DC source 16 for providing the electrode plate unit 14 with DC electricity.

The electrolysis cleaning tank 12 is constructed from a container in the form of box. A water inlet 22 is provided at the bottom 18 and close to a side section of the electrolysis cleaning tank 12. The water inlet 22 receives the circulation water, which is withdrawn from a water receiving tank 74 of a cooling tower 68 described hereinafter via a water supplying pump 20. The size or capacity of the electrolysis cleaning tank 12 and the water supplying pump 20 are determined depending on the size or capacity of the cooling tower 68.

The electrode plate unit 14 consists of a plurality of first electrode plates 24 and a plurality of second electrode plates 26, which are alternately placed with a predetermined space between the plates, in a parallel manner. The size of the electrode plate unit 14 is determined depending on the size or capacity of the cooling tower intended to be used.

The first electrode plates 24 and the second electrode plates 26 of the electrode plate unit 14 are connected to the positive and negative output terminals of the DC source 16, respectively. The DC source 16 consists of a DC stabilized source capable of providing current ranging from about 0.1 to about 20 amperes per unit area (m$^2$) of one of the first electrode plates 24.

Two parallel overflow partitions 30 are oriented almost perpendicularly with a predetermined space, on the far side of the water inlet 22, and between the side section 28 of the electrolysis cleaning tank 12 and the electrode plate unit 14. One of the partitions is placed slightly out of alignment with the other in the vertical direction. An outlet 32 for draining cleaned circulation water is provided at the upper portion of the side section 28 of the electrolysis cleaning tank 12, on the same side that the overflow partitions 30 are provided.

A conductivity meter 34 for measuring the electric conductivity of circulation water is provided close to the outlet 32 between the side section 28 of the electrolysis cleaning tank 12 and the overflow partitions 30. The conductivity meter 34 is connected to alarm equipment 38, such that an alarm lamp 40 will turn on or an alarm buzzer 42 will sound, when the electric conductivity of the circulation water is greater than or equal to a predetermined value.

A float switch 36 is attached to the upper portion of the electrolysis cleaning tank 12. The alarm lamp 40 will turn on or the alarm buzzer 42 will sound by the float switch 36, if scale has accumulated in a filtration part 60 of the receiving tank 44 and has caused flow resistance of treated water, thereby preventing the treated water from flowing out of the electrolysis cleaning tank 12.

The receiving tank 44 is placed below the electrolysis cleaning tank 12, in order to temporarily contain circulation water cleaned in the electrolysis cleaning tank 12. The outlet 32 is associated with the receiving tank 44 via a drain line 46.

A return pump 48 is provided near the receiving tank 44, in order to deliver cleaned circulation water contained in the receiving tank 44 back to the cooling tower 68. A float switch 50 is provided in the receiving tank 44, so that circulation water contained in the receiving tank 44 will return to the cooling tower 68 by operating the return pump 48, when the circulation water in the receiving tank 44 is higher than or equal to a predetermined level.

A drain 52 is provided at or in the vicinity of the center of the bottom 18 of the electrolysis cleaning tank 12, in order to release detached scale through the drain 52. The bottom 18 of the electrolysis cleaning tank 12 is tilted downward to the drain 52, and the tilt angle ranges from 25 to 35 degrees.

A draining device 54 is provided at the site of the drain 52 on the outside of the bottom 18 of the cleaning tank 12, such that the draining device is directed downward. The draining device 54 comprises a gating device or a draining valve 56, the gating timing and duration of which is controlled by a gating timer 58.

The exit side of the draining device 54 is open without being connected by an additional line. A filtration part 60 is provided just below the draining device 54 and above the receiving tank 44, in order to separate scale drained along with circulation water.

The capacity of the draining device 54 is such that the maximum flow rate of draining water can be equal to or more than 30 liters per minute, when the electrolysis cleaning tank 12 is filled with water at a predetermined level and the draining valve 56 is fully open.

Figure 3:
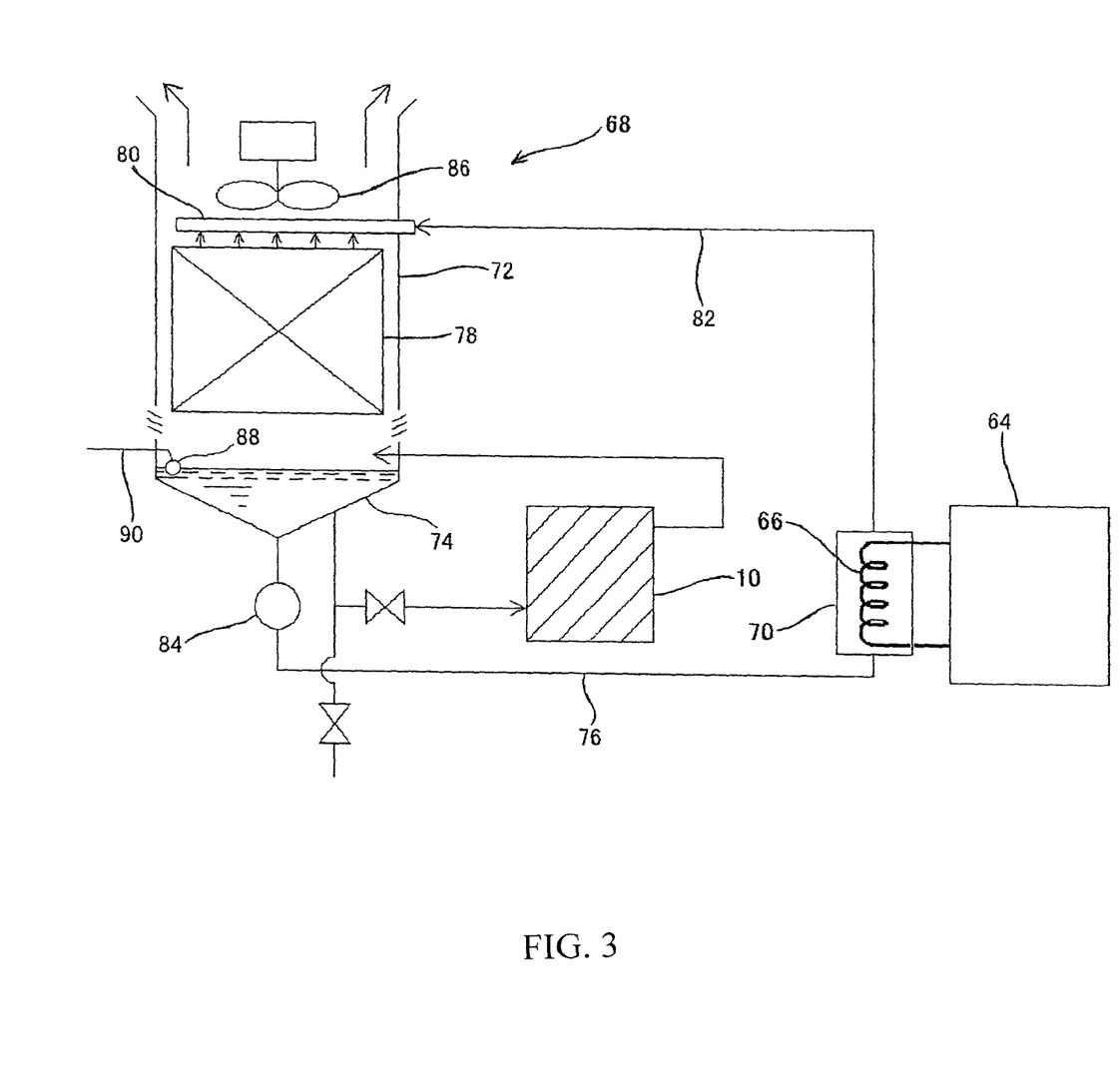
FIG. 3 illustrates an air-conditioning system incorporating the cleaning device of FIG. 1.
Figure 4:
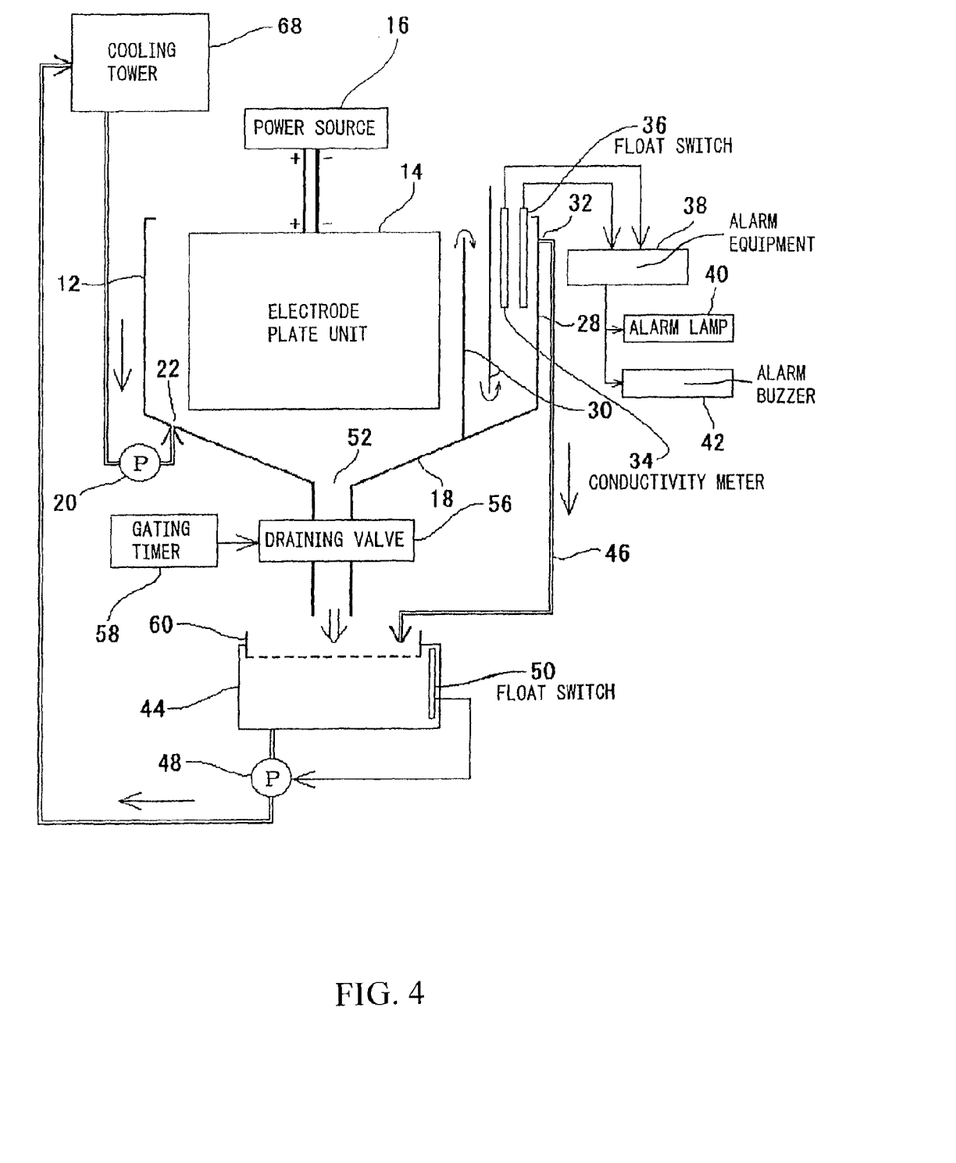
FIG. 4 illustrates a controlling scheme of the cleaning device for circulation water in a cooling tower, according to one embodiment of the present invention.

Next, the operation of the cleaning device for circulation water in the cooling tower will be described below, with reference to FIGS. 3 and 4. FIG. 3 illustrates an air-conditioning system incorporating the cleaning device as described in FIG. 1, and FIG. 4 illustrates a controlling scheme of the cleaning device for circulation water in the cooling tower, according to one embodiment of the present invention.

The circulation water is pumped out of a water receiving tank 74 of the cooling tower 68 by operating the water supplying pump 20, and then supplied to the electrolysis cleaning tank 12 through the water inlet 22 of the electrolysis cleaning tank 12.

The supplied circulation water submerges the electrode plate unit 14, passes over the overflow partitions 30, overflows from the electrolysis cleaning tank 12 through the outlet 32, and enters the receiving tank 44.

The float switch 50 in the receiving tank 44 is adjusted to be switched on at the predetermined level. Accordingly, when the circulation water in the receiving tank 44 reaches the predetermined level, the float switch 50 is switched on and in turn the return pump 48 starts to operate. As a result, circulation water flowing into the receiving tank 44 is delivered back to the water receiving tank 74 in the cooling tower 68 by the return pump 48.

When the DC source 16 starts to operate under the condition that the electrolysis cleaning tank 12 is filled with circulation water, a positive and negative voltage is applied to the first electrode plates 24 and the second electrode plates 26, respectively. Metal ions contained in the circulation water, such as calcium, magnesium, and dissolved silica, are drawn to the second electrode plates 26, and thus reduced on the surface thereof, resulting in the precipitation of the scale on or in the vicinity of the surface of the second electrode plates 26, to gradually reduce these cations in the circulation water.

In this embodiment, a constant current DC source is used as the DC source. Constant current flowing between the first electrode plates 24 and the second electrode plates 26 forms an anodized oxide coating on the surface of the first electrode plates 24 functioning as positive electrodes, and thus the surface resistance of the first electrode plates 24 increases. While the resistance increases, the voltage applied to the anodized oxide coating on the surface of the first electrode plates 24 will also increase in proportion to this increased resistance, and the anodized oxide coating on the surface of the first electrode plates 24 is subject to dielectric breakdown. As a result, the anodized oxide coating is peeled off the first electrode plates 24, and the surface resistance of the first electrode 24 decreases.

After continuous cleaning of circulation water by electrolysis for a certain amount of time, scale will precipitate on or in the vicinity of the surface of the second electrode plates 26, and gradually accumulate on the bottom 18 of the electrolysis cleaning tank 12 as a sludge-like substance.

The gating timer 58 opens the draining valve 56, in accordance with a predetermined setting for controlling the operation timing and retention period of the valve 56, after the predetermined operation time elapses, and as a result, circulation water in the electrolysis cleaning tank 12 is drained along with scale accumulated on the bottom 18, by passing through the draining device 54.

Scale in the drained circulation water is removed by filtering through the filtration part 60 and the resultant circulation water enters the receiving tank 44. The draining valve 56 closes after the predetermined retention time elapses, and the electrolysis cleaning tank 12 is refilled with the circulation water. When a certain amount is accumulated, the remaining scale on the filtration part 60 is sequentially transported and removed out of the filtration part 60.

The conductivity meter 34 placed near the outlet of the electrolysis cleaning tank 12 constantly monitors the electric conductivity of the circulation water. If the electric conductivity of the circulation water becomes more than or equal to the predetermined value, the alarm equipment 38 operates so as to turn on the alarm lamp 40 and sound the alarm buzzer 42.

The float switch 36 attached to the upper portion of the electrolysis cleaning tank 12 monitors the flow resistance of the treated water, as a result of the accumulation of scale on the filtration part 60 of the receiving tank 44. If the flow resistance becomes more than or equal to the predetermined value, the water level thus rises to the level of the float switch 36, resulting in the alarm lamp 40 turning on and the alarm buzzer 42 sounding.

EXAMPLES

Example 1

Circulation water in a cooling tower with a capacity of 120 refrigerating tons was withdrawn from a circulating channel, cleaned by passing through a device according to the present invention, and then brought back to the circulating channel.

The electrode plate unit 14 used in the device according to the present invention was comprised of seventy-two (72) titanium plates, having a width of 300 mm, a height of 600 mm, and a thickness of 1 mm. The thirty-six (36) plates were oriented so as to face the other thirty-six (36) titanium plates with a pitch of 24 mm between the plates. A constant current DC source was used as the DC source 16, in order to supply a constant current of six amperes to the electrode plate unit 14.

Figure 5:
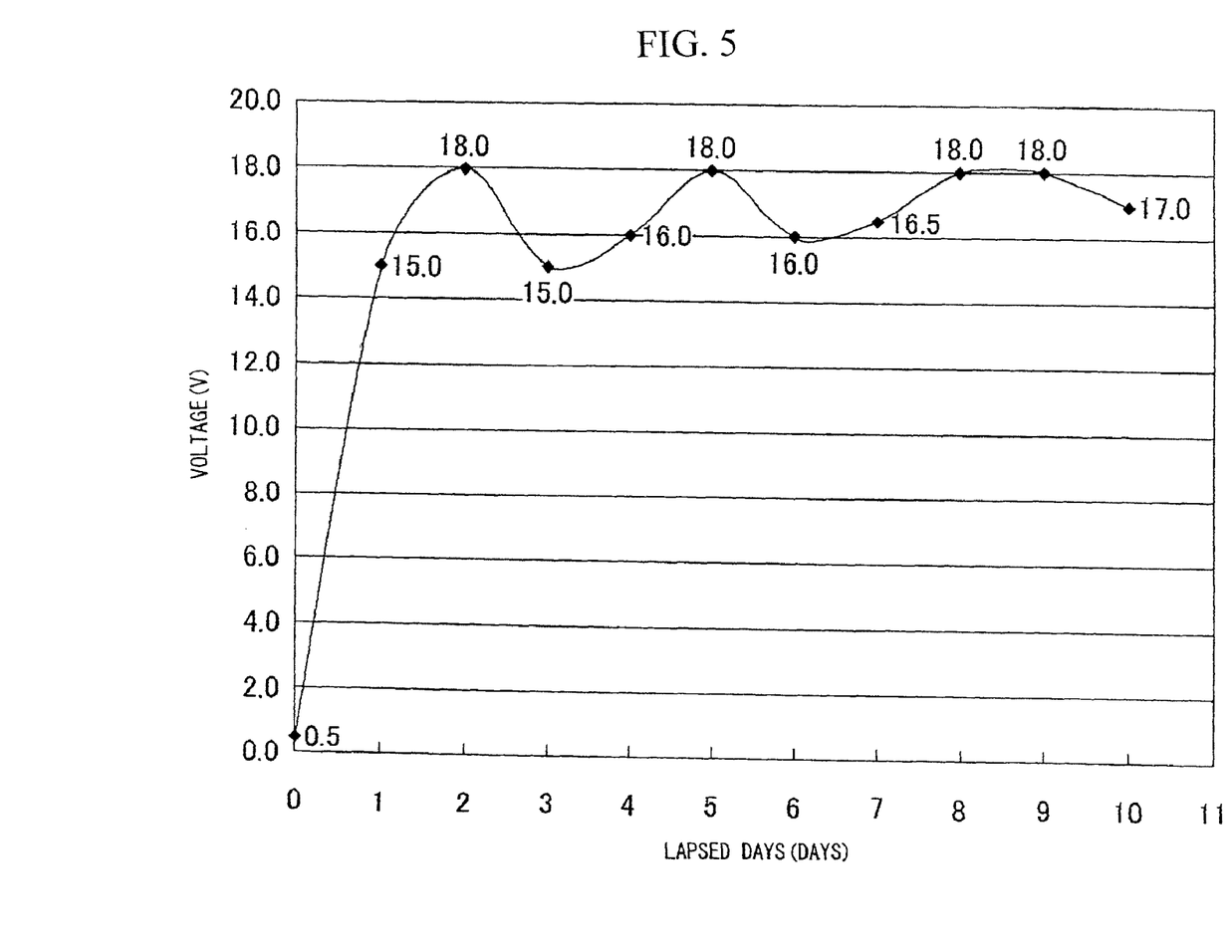
FIG. 5 is a graph illustrating the relationship of voltage applied between electrode plates and an electric conductivity or a redox potential.

As shown in FIG. 5, voltage between the electrode plates was 0.5 V during an initial period, and derived from the constant current between the electrode plates supplied by the constant current DC source. However, the voltage gradually increased in conjunction with an increase in the resistance of the anodized oxide coating formed on the surface of the positive electrode plates, eventually reaching about 18 V. Once the voltage had reached this value, the anodized oxide coating was subject to dielectric breakdown and then peeled off, resulting in a reduction of resistance, and thus the voltage between the electrode plates dropped to about 15 V. The resistance between the electrode plates did not drop further, and the anodized oxide coating then began to regenerate. In this manner, the cycle of generation, breakdown and peeling of the anodized oxide coating repeats.

Figure 6:
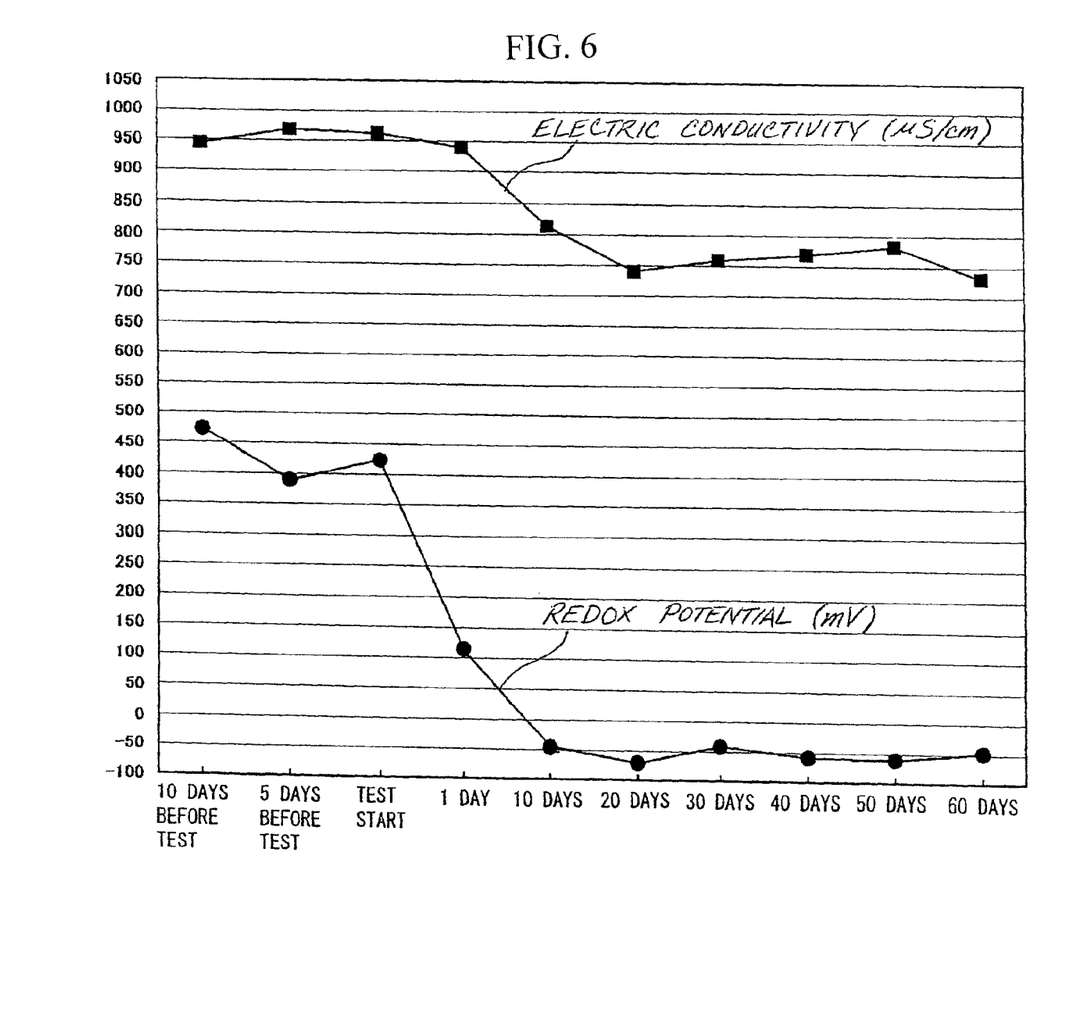
FIG. 6 is a graph illustrating a change in electric conductivity and a redox potential in relation to voltage deviation.

The electric conductivity of the circulation water in this example, as shown in FIG. 6, was initially 1000 μS/cm, and then gradually decreased and stabilized from 700 to 850 μS/cm. Similarly, the redox potential was initially 470 mV as shown in FIG. 6, and then gradually decreased and stabilized at minus sixty (−60) mV. The sludge-like substance, accumulated in the bottom of the electrolysis cleaning tank, was analyzed and found to include silica, calcium and magnesium, and titanium oxide subjected to dielectric breakdown, as main components.

Example 2

Figure 7:
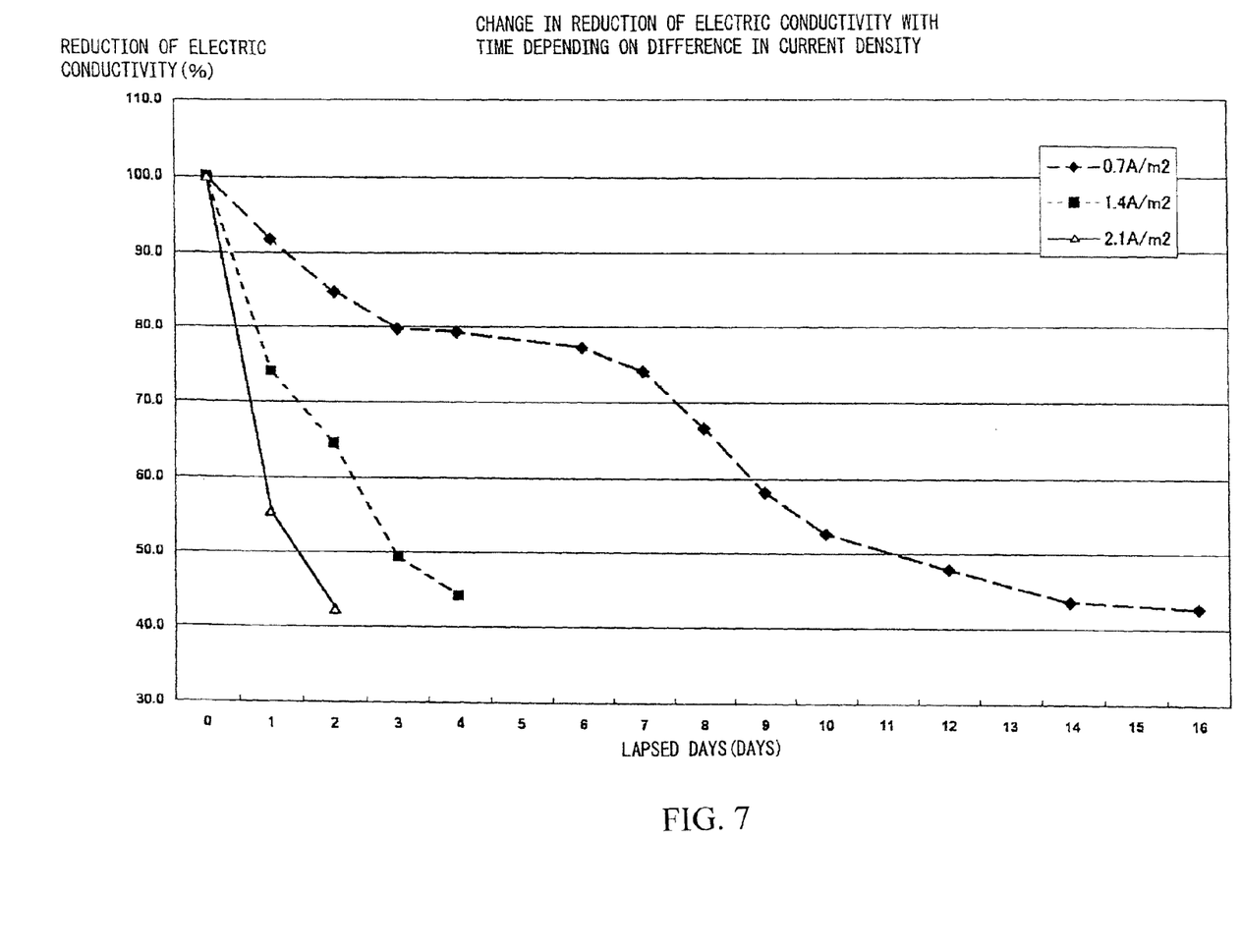
FIG. 7 is a graph illustrating the relationship of the amount of current density (A/m$^2$) and a decreasing rate of electric conductivity (µS/cm).

This experiment was performed in the same manner described in Example 1, except that the current density flowing between the electrode plates in the unit varied at three levels, i.e. 0.7 A/m$^2$, 1.4 A/m$^2$ and 2.1 A/m$^2$. FIG. 7 shows the electric conductivity of the circulation water. This experiment demonstrates that higher current density decreases the electric conductivity of circulation water in a shorter period.

Example 3

After a one-week of continuous operation under the conditions described in Example 1, the polarity was reversed and the operation was continued, and as a result, scale firmly adhered to the surface of the positive electrodes, which were negative electrodes before, was peeled off and deposited in the bottom of the electrolysis tank.

The operation was then continued for one more week under the same conditions, the scale was firmly adhered to the surface of the negative electrodes, as is the case with the initial operation. However, it was anticipated that further continuous operation would leave the scale firmly adhered to the negative electrodes, thereby making the recovery of the scale difficult, or reducing the efficiency of the adhesion of the scale due to the electric resistance. Therefore, the operation was continued by reversing the polarity alternately once every other week. As a result, scale adhered to the negative electrodes was efficiently peeled off, and then deposited in the bottom of the electrolysis cleaning tank 12, along with the anodized oxide coating peeled off by dielectric breakdown. Repeating this reversal of polarity enabled scale firmly adhered to the negative electrodes to be peeled off and recycled efficiently, and the efficiency in electrolysis to be maintained at a certain level by preventing scale from adhering to the negative electrodes.

Example 4

Figure 8:
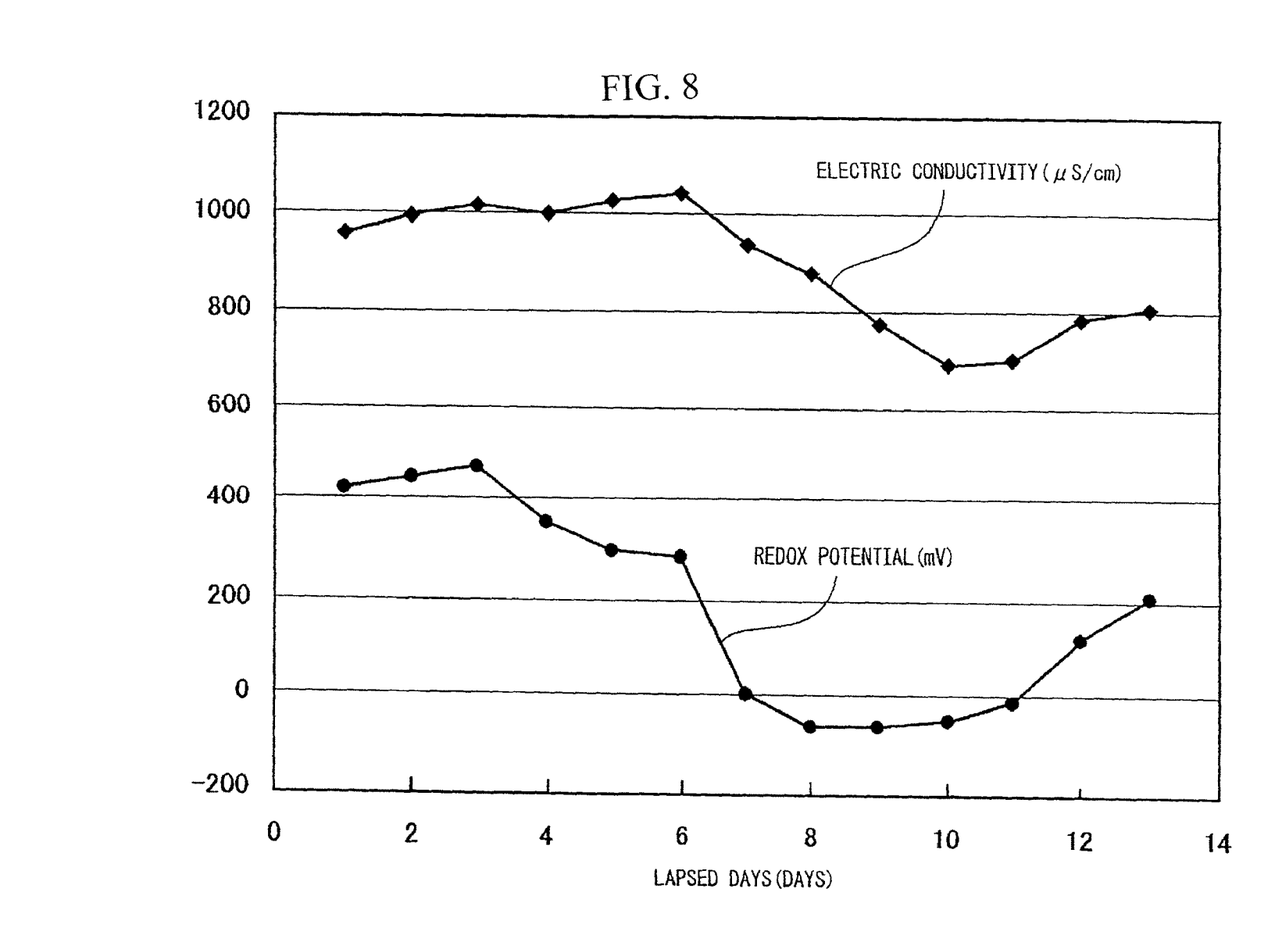
FIG. 8 is a graph illustrating a change in electric conductivity and a redox potential in relation to current deviation.

A constant current source was used, and the current supplied to the electrode plate unit 14 by the DC source 16 was adjusted, depending on the electric conductivity obtained by the conductivity meter 34, under the conditions described in Example 1. In other words, the current was increased to about twice when the electric conductivity exceeded 1000 μS/cm, while the current was decreased to the initial value when the electric conductivity dropped below 700 μS/cm. As a result, the electric conductivity decreased from 1040 μS/cm to 690 μS/cm by increasing the current to about twice, while the electric conductivity increased from 690 μS/cm to 810 μS/cm by decreasing the current to the initial value, as shown in FIG. 8. This result demonstrates that the desired performance could be achieved by controlling the current supplied to the electrode plate unit 14.

In summary, scale in the circulation water was removed efficiently. Electricity costs were also saved and corrosion and/or consumption of the electrode plates was avoided, because it was not necessary to flow excess current when the electric conductivity was within an acceptable range.

Example 5

As with the case described in Example 4, the ORP meter for measuring the redox potential of the circulation water and the constant current source were used, and current supplied to the electrode plate unit 14 was increased, depending on the redox potential obtained by the ORP meter. In other words, the current was increased by 100% when the redox potential exceeded 200 mV. As a result, the redox potential decreased from 280 mV to −60 mV by increasing the current by 100%, as shown in FIG. 8. This result demonstrates that the desired performance was able to be achieved by controlling the current supplied to the electrode plate unit 14.

In summary, scale in the circulation water was efficiently removed. Electricity costs were also saved and corrosion of the electrode plates was avoided, because it was not necessary to flow excess current when the redox potential was within an acceptable range.

A constant voltage DC source may be used as a DC source, instead of the constant current DC source used in the above examples. In such cases, current flowing between the electrode plates is monitored by an ammeter (not shown), and power source voltage is increased when the current drops below a predetermined value. By increasing power source voltage, the anodized oxide coating on the surface of the electrode plates will be subject to dielectric breakdown and peel off, and accordingly the resistance between the electrode plates will decrease, allowing current to flow at a predetermined value. Then, the power source voltage is brought back to the initial value, and by doing so excess current will not flow between the electrodes, and therefore rapid corrosion of the electrode plates can be prevented.

Industrial Applicability

This invention is applicable to cleaning of circulation water in a cooling tower, as well as in a 24-hour bath, a swimming pool, an artificial pond, and the like.

The invention claimed is:

1. A method for cleaning circulation water comprising the steps of
    flowing circulation water to be cleaned between a plurality of electrode plates placed in a face-to-face manner between one another;
    applying DC voltage between said plurality of electrode plates; and
    allowing one or more metal ions contained in the circulation water to be precipitated onto negative electrode plates of the plurality of electrode plates by electrolysis, to clean the circulation water,
    wherein the electrode plates used are made of titanium, and wherein an anodized oxide coating formed on the surface of the positive electrode plates is subject to dielectric breakdown by increasing the applied voltage while a current flows between the plurality of electrode plates.

2. The method according to claim 1, wherein the voltage applied between the electrode plates is switched in polarity at regular intervals.

3. The method according to claim 1 or 2, wherein the current flowing between the electrode plates is a constant current.

4. The method according to claim 3, wherein the current flowing between the electrode plates ranges from 0.1 to 20 ampere (A) per unit area (1 m$^2$) of one of the positive electrode plates.

5. The method according to claim 1 or 2, wherein the voltage applied between the electrode plates is set to a constant value, and wherein voltage applied between the electrode plates is increased when the current flowing between the electrode plates is less than a predetermined value, while voltage applied between the electrode plates is restored to the constant value when the current flowing between the electrode plates is more than or equal to a predetermined value.

6. The method according to claim 1 or 2, wherein the current flowing between the electrode plates is increased when the electric conductivity of the circulation water is more than a first predetermined value, while current flowing between the electrode plates is decreased when the electric conductivity of the circulation water is less than a second predetermined value, the first predetermined value being more than or equal to the second predetermined value.

7. The method according to claim 6, wherein the first and second predetermined values for the electric conductivity of the circulation water range from 500 to 1000 μS/cm.

8. The method according to claim 1 or 2, wherein the current flowing between the electrode plates is increased when the redox potential of the circulation water is more than a first predetermined value, while the current flowing between the electrode plates is decreased when the redox potential of the circulation water is less than a second predetermined value, the first predetermined value being more than or equal to the second predetermined value.

9. The method according to claim 8, wherein the first and second predetermined values for the redox potential of the circulation water range from +100 to −100 mV.

* * * * *